United States Patent
Grohoski et al.

(10) Patent No.: US 7,290,116 B1
(45) Date of Patent: Oct. 30, 2007

(54) LEVEL 2 CACHE INDEX HASHING TO AVOID HOT SPOTS

(75) Inventors: Greg F. Grohoski, Bee Cave, TX (US); Manish Shah, Austin, TX (US); John D. Davis, Los Altos Hills, CA (US); Ashley Saulsbury, Los Gatos, CA (US); Cong Fu, San Jose, CA (US); Venkatesh Iyengar, Santa Clara, CA (US); Jenn-Yuan Tsai, Cupertino, CA (US); Jeff Gibson, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 319 days.

(21) Appl. No.: 10/881,714

(22) Filed: Jun. 30, 2004

(51) Int. Cl.
    *G06F 12/00* (2006.01)
(52) U.S. Cl. .................. 711/216; 711/3; 711/130; 711/202
(58) Field of Classification Search .................. None
See application file for complete search history.

(56) References Cited

U.S. PATENT DOCUMENTS

| | | | |
|---|---|---|---|
| 5,446,854 A * | 8/1995 | Khalidi et al. .................. 711/1 |
| 5,465,337 A | 11/1995 | Kong | |
| 5,479,627 A | 12/1995 | Khalidi et al. | |
| 5,596,293 A | 1/1997 | Rogers et al. | |
| 5,712,791 A | 1/1998 | Lauterbach .................. 364/489 |
| 5,717,885 A | 2/1998 | Kumar et al. | |
| 5,742,792 A | 4/1998 | Yanai et al. | |
| 5,761,511 A | 6/1998 | Gibbons et al. | |
| 5,761,707 A | 6/1998 | Aiken et al. | |
| 5,802,341 A | 9/1998 | Kline et al. | |
| 5,802,561 A | 9/1998 | Fava et al. | |
| 5,828,860 A | 10/1998 | Miyaoku et al. | |
| 5,842,225 A | 11/1998 | Kohn | |
| 5,860,147 A | 1/1999 | Gochman et al. | |
| 5,862,450 A | 1/1999 | Mandal et al. ............. 455/3.1 |
| 5,895,487 A | 4/1999 | Boyd et al. | |
| 5,899,994 A | 5/1999 | Mohamed et al. | |
| 5,900,011 A | 5/1999 | Saulsbury et al. | |
| 5,911,071 A | 6/1999 | Jordan | |
| 5,918,005 A | 6/1999 | Moreno et al. | |
| 5,933,627 A | 8/1999 | Parady .................. 395/569 |
| 5,953,010 A | 9/1999 | Kampe et al. | |

(Continued)

OTHER PUBLICATIONS

R. Heald et al., "A Third-Generation SPARC V9 64-b Microprocessor," IEEE JSSC, Nov. 2000, pp. 1526-1538.

(Continued)

*Primary Examiner*—Reginald Bragdon
*Assistant Examiner*—Horace L. Flournoy
(74) *Attorney, Agent, or Firm*—Darby & Darby PC; M. David Ream

(57) ABSTRACT

An apparatus and method for mapping memory addresses to reduce or avoid conflicting memory accesses in memory systems such as cache memories is described in connection with a multithreaded multiprocessor chip. A CMT processor reduces the probability of hot-spots in cache operations by hashing certain bits of a physical cache address to form a hashed cache address. By using exclusive OR functionality to hash the index bits, an efficient address transformation is achieved for indexing into an L2 cache memory.

20 Claims, 8 Drawing Sheets

U.S. PATENT DOCUMENTS

| | | | |
|---|---|---|---|
| 5,956,756 A | 9/1999 | Khalidi et al. | |
| 5,991,790 A | 11/1999 | Shah et al. | |
| 6,016,542 A | 1/2000 | Gottlieb et al. | 712/225 |
| 6,044,446 A | 3/2000 | Joy et al. | |
| 6,092,154 A | 7/2000 | Curtis et al. | 711/137 |
| 6,098,169 A | 8/2000 | Ranganathan | 712/227 |
| 6,105,127 A | 8/2000 | Kimura et al. | |
| 6,141,692 A | 10/2000 | Loewenstein et al. | 709/234 |
| 6,199,142 B1 | 3/2001 | Saulsbury et al. | |
| 6,247,121 B1 | 6/2001 | Akkary et al. | 712/239 |
| 6,272,520 B1 | 8/2001 | Sharangpani et al. | 709/108 |
| 6,295,600 B1 | 9/2001 | Parady | 712/228 |
| 6,308,279 B1 | 10/2001 | Toll et al. | 713/323 |
| 6,311,261 B1 | 10/2001 | Chamdani et al. | |
| 6,314,563 B1 | 11/2001 | Agesen et al. | 717/9 |
| 6,374,349 B1 | 4/2002 | McFarling | |
| 6,408,368 B1 | 6/2002 | Parady | |
| 6,415,356 B1 | 7/2002 | Chaudhry et al. | |
| 6,449,694 B1 | 9/2002 | Burgess, Jr. et al. | |
| 6,493,819 B1 | 12/2002 | Mahurin et al. | |
| 6,535,905 B1 | 3/2003 | Kalafatis et al. | 709/108 |
| 6,578,137 B2 | 6/2003 | Parady | 712/228 |
| 6,609,193 B1 | 8/2003 | Douglas et al. | 712/219 |
| 6,625,654 B1 | 9/2003 | Wolrich et al. | 709/230 |
| 6,633,984 B2 | 10/2003 | Susser et al. | 713/201 |
| 6,647,458 B1 | 10/2003 | Glynn | |
| 6,671,707 B1 | 12/2003 | Hudson et al. | 707/206 |
| 6,700,410 B2 | 3/2004 | Ebergen | 326/93 |
| 6,700,825 B1 | 3/2004 | Ebergen | 365/221 |
| 6,715,057 B1 | 3/2004 | Kessler et al. | |
| 6,718,438 B2 | 4/2004 | Lewis et al. | |
| 6,718,494 B1 | 4/2004 | Jamil et al. | |
| 6,732,143 B1 | 5/2004 | Saulsbury | |
| 6,751,655 B1 | 6/2004 | Deutsch et al. | |
| 6,766,428 B2 | 7/2004 | Saulsbury et al. | |
| 6,772,369 B2 | 8/2004 | Smith et al. | |
| 6,779,087 B2 | 8/2004 | Saulsbury et al. | |
| 6,802,039 B1 | 10/2004 | Quach et al. | |
| 6,816,961 B2 | 11/2004 | Rice et al. | |
| 6,854,075 B2 | 2/2005 | Mukherjee et al. | |
| 6,862,027 B2 | 3/2005 | Andrews et al. | |
| 7,003,648 B2 | 2/2006 | Chrysos et al. | |
| 7,130,967 B2 * | 10/2006 | Arimilli et al. | 711/137 |
| 2001/0047468 A1 | 11/2001 | Parady | 712/228 |
| 2002/0052926 A1 | 5/2002 | Bush et al. | 709/217 |
| 2002/0087840 A1 | 7/2002 | Kottapalli et al. | |
| 2002/0129309 A1 | 9/2002 | Floyd et al. | 714/724 |
| 2002/0162092 A1 | 10/2002 | Ravichandran | |
| 2002/0199070 A1 | 12/2002 | Chaudhry et al. | |
| 2003/0088610 A1 | 5/2003 | Kohn et al. | 709/107 |
| 2003/0088713 A1 | 5/2003 | Mandal et al. | |
| 2003/0097518 A1 | 5/2003 | Kohn et al. | 711/5 |
| 2003/0105756 A1 | 6/2003 | Daynes | 707/8 |
| 2003/0105907 A1 | 6/2003 | Kohn et al. | 710/305 |
| 2003/0120825 A1 | 6/2003 | Avvari et al. | 709/316 |
| 2003/0149861 A1 | 8/2003 | Becker | 712/214 |
| 2003/0163645 A1 | 8/2003 | Tremblay et al. | 711/137 |
| 2003/0191927 A1 | 10/2003 | Joy et al. | 712/228 |
| 2003/0196066 A1 * | 10/2003 | Mathews | 711/207 |
| 2003/0212874 A1 | 11/2003 | Alderson | 711/170 |
| 2004/0002974 A1 | 1/2004 | Kravitz et al. | 707/8 |
| 2004/0003208 A1 | 1/2004 | Damron | 712/225 |
| 2004/0003211 A1 | 1/2004 | Damron | 712/228 |
| 2004/0006633 A1 | 1/2004 | Chandra et al. | 709/231 |
| 2004/0034853 A1 | 2/2004 | Gibbons et al. | 717/174 |
| 2004/0073906 A1 | 4/2004 | Chamdani et al. | 718/102 |
| 2004/0088487 A1 * | 5/2004 | Barroso et al. | 711/122 |
| 2004/0098496 A1 * | 5/2004 | Wolrich et al. | 709/230 |
| 2004/0117600 A1 * | 6/2004 | Bodas et al. | 712/210 |
| 2004/0123028 A1 | 6/2004 | Kanai et al. | |
| 2004/0148472 A1 | 7/2004 | Barroso et al. | |
| 2005/0114856 A1 | 5/2005 | Elckemeyer et al. | |
| 2005/0193283 A1 | 9/2005 | Reinhardt et al. | |

OTHER PUBLICATIONS

"Introduction to Throughput Computing," Sun Microsystems whitepaper, Feb. 2003.

D. Wendell et al., "A 4 MB On-Chip L2 Cache for a 90nm 1.6GHz 64 bit Microprocessor," IEEE JSSC (Feb. 2004).

G. Konstadinidis et al., "Implementation of a Third-Generation 1.1GHz 64b Microprocessor," 2002 IEEE Journal of Solid-State Circuits, vol. 37, No. 11, pp. 1461-1469 (Nov. 2002).

K. Krewell, "Sun Weaves Multithreaded Future," Microprocessor Report, Reed Electronics Group (Apr. 14, 2003).

"UltraSPARC® IV Processor," User's Manual Supplement, Sun Microsystems, version 1.0 (Apr. 2004).

"The UltraSPARC® IIIi Processor" Architecture Overview, Technical Whitepaper, Sun Microsystems, version 1.2 (Apr. 2004).

"UltraSPARC® IV Processor," Architecture Overview, Technical Whitepaper, Sun Microsystems, Version 1.0 (Feb. 2004).

R. Ronen, "VLSI Architecture Design Course," Lecture #10, Multithreaded Architectures (dated May 2003).

K. Mai et al., "Smart Memories: A Modular Reconfigurable Architecture," Stanford University Proceedings of the 17th ISCA (Jun. 2000).

L. Hammond et al., "The Standford Hydra CMP," IEEE Micro, pp. 71-84, (Mar.-Apr. 2000).

L. Hammond et al., "Considerations in the Design of Hydra: A Multiprocessor-on-a-Chip Microarchitecture," Technical Report No.: CSL-TR-98-749, pp. 1-10 (Feb. 1998).

K. Privitt, et al., "Threading: Connecting the Pieces, System Architecture, Application, OS and Tools," Intel Developer Forum (Feb. 17-19, 2004).

M. Kharbutli et al., "Using Prime Numbers for Cache Indexing to Eliminate Conflict Masses," 10th Annual Symposium on High Performance Computer Architecture (Feb. 14-18, 2004).

Mukherjee, S. et al., "Detailed Design and Evaluation of Redundant Multithreading Alternatives," Computer Architecture, 2002, Proceedings 29th Annual International Symposium, pp. 1-12.

Reinhardt, S.K. et al., "Transient Fault Detection via Simultaneous Multithreading," Computer Architecture, 2000, Proceedings of the 27th International Symposium, 12 pages.

Kalla, R. et al., "IBM Power5 Chip: A Dual-Core Multithreaded Processor," Published by the IEEE Computer Society, Mar.-Apr. 2004, pp. 40-47.

Watanabe, K. et al., "Exploiting Java Instruction/Thread Level Parallelism with Horizontal Multithreading," IEEE, 2001, pp. 122-129.

Chen, S. et al., "Out-of-Order Memory Accesses Using a Load Wait Buffer," http://www.ece.cmu.edu/~schen1/18-741_final_report.pdf, pp. 1-8, published Feb. 2003.

"Igniting a Computing Revolution! Throughput Computing," Sun Microsystems Brochure, published Sep. 2003.

"UltralSPARC® IV Processor," Datasheet, Sun Microsystems, published Jan. 2004.

Hennessy, J. et al., "Computer Architecture: A Quantitative Approach," Morgan Kaufmann, third edition, 2002, pp. A-68 to A-77.

Hoe, J.C. "Superscalar Out-of-Order Dernystified in Four Instructions," 2003, http://www.ece.cmu.edu/~jhoe/distribution/2003/wcae03.pdf, pp. 1-6.

Chen, S. et al., "Out-of-Order Memory Accesses Using a Load Wait Buffer," http://www.ece.cmu.edu/~schen1/18-741_final_report.pdf, pp. 1-8.

Handy, Jim (1998) "The Cache Memory Book," Academic Press Ltd., 2nd Ed., pp. 42-45 and 89-94.

Wikipedia, "Thread (Computer Science)," Version as of Jan. 5, 2004. Accessed 3, Jan. 2007, http://en.wikipedia.org/wiki/Thread_(computer science).

* cited by examiner

LEVEL 2 CACHE INDEX HASHING TO AVOID HOT SPOTS

BACKGROUND OF THE INVENTION

1. Field of the Invention

The present invention relates generally to the field of processor or computer design and operation. In one aspect, the present invention relates to memory operations in a multi-threaded processor.

2. Description of the Related Art

Computer systems are constructed of many components, typically including one or more processors that are connected for access to one or more memory devices (such as RAM) and secondary storage devices (such as hard disks and optical discs). For example, FIG. 1 is a diagram illustrating a computer system 10 with multiple memories. Generally, a processor 1 connects to a system bus 12. Also connected to the system bus 12 is a memory (e.g., 14). During processor operation, CPU 2 processes instructions and performs calculations. Data for the CPU operation is stored in and retrieved from memory using a memory controller 8 and cache memory, which holds recently or frequently used data or instructions for expedited retrieval by the CPU 2. Specifically, a first level (L1) cache 4 connects to the CPU 2, followed by a second level (L2) cache 6 connected to the L1 cache 4. The CPU 2 transfers information to the L2 cache 6 via the L1 cache 4. Such computer systems may be used in a variety of applications, including as a server 10 that is connected in a distributed network, such as Internet 9, enabling server 10 to communicate with clients A-X, 3, 5, 7.

Because processor clock frequency is increasing more quickly than memory speeds, there is an ever increasing gap between processor speed and memory access speed. In fact, memory speeds have only been doubling every six years— one-third the rate of microprocessors. In many commercial computing applications, this speed gap results in a large percentage of time elapsing during pipeline stalling and idling, rather than in productive execution, due to cache misses and latency in accessing external caches or external memory following the cache misses. Stalling and idling are most detrimental, due to frequent cache misses, in database handling operations such as OLTP, DSS, data mining, financial forecasting, mechanical and electronic computer-aided design (MCAD/ECAD), web servers, data servers, and the like. Thus, although a processor may execute at high speed, much time is wasted while idly awaiting data.

One technique for reducing stalling and idling is hardware multithreading to achieve processor execution during otherwise idle cycles. FIGS. 2a and 2b show two timing diagrams illustrating an execution flow 22 in a single-thread processor and an execution flow 24 in a vertical multithread processor. Processing applications, such as database applications and network computing applications, spend a significant portion of execution time stalled awaiting memory servicing. This is illustrated in FIG. 2a, which depicts a highly schematic timing diagram showing execution flow 22 of a single-thread processor executing a database application. The areas within the execution flow 22 labeled as "C" correspond to periods of execution in which the single-thread processor core issues instructions. The areas within the execution flow 22 labeled as "M" correspond to time periods in which the single-thread processor core is stalled waiting for data or instructions from memory or an external cache. A typical single-thread processor executing a typical database application executes instructions about 25% of the time with the remaining 75% of the time elapsed in a stalled condition. The 25% utilization rate exemplifies the inefficient usage of resources by a single-thread processor.

FIG. 2b is a highly schematic timing diagram showing execution flow 24 of similar database operations by a multithread processor. Applications, such as database applications, have a large amount of inherent parallelism due to the heavy throughput orientation of database applications and the common database functionality of processing several independent transactions at one time. The basic concept of exploiting multithread functionality involves using processor resources efficiently when a thread is stalled by executing other threads while the stalled thread remains stalled. The execution flow 24 depicts a first thread 25, a second thread 26, a third thread 27 and a fourth thread 28, all of which are labeled to show the execution (C) and stalled or memory (M) phases. As one thread stalls, for example first thread 25, another thread, such as second thread 26, switches into execution on the otherwise unused or idle pipeline. There may also be idle times (not shown) when all threads are stalled. Overall processor utilization is significantly improved by multithreading. The illustrative technique of multithreading employs replication of architected registers for each thread and is called "vertical multithreading."

Vertical multithreading is advantageous in processing applications in which frequent cache misses result in heavy clock penalties. When cache misses cause a first thread to stall, vertical multithreading permits a second thread to execute when the processor would otherwise remain idle. The second thread thus takes over execution of the pipeline. A context switch from the first thread to the second thread involves saving the useful states of the first thread and assigning new states to the second thread. When the first thread restarts after stalling, the saved states are returned and the first thread proceeds in execution. Vertical multithreading imposes costs on a processor in resources used for saving and restoring thread states, and may involve replication of some processor resources, for example replication of architected registers, for each thread. In addition, vertical multithreading complicates any ordering and coherency requirements for memory operations when multiple threads and/or multiple processors are vying for access to any shared memory resources.

Accordingly, improved memory operations for multithreading and/or multiprocessor circuits and operating methods are needed that are economical in resources and avoid costly overhead which reduces processor performance. In addition, an efficient memory addressing protocol is needed that reduces contention problems caused by multiple threads and/or processors making memory access requests to a shared memory resource. Further limitations and disadvantages of conventional systems will become apparent to one of skill in the art after reviewing the remainder of the present application with reference to the drawings and detailed description which follow.

SUMMARY OF THE INVENTION

Broadly speaking, the present invention is a method and system for mapping memory addresses to reduce or avoid conflicting memory accesses in memory systems such as cache memories. To reduce address conflicts, a memory address is randomized to map a first addressing scheme (e.g., the memory address) into a second addressing scheme (e.g., the physical address used to access a cache) by hashing a portion (such as an index) of the memory address. The mapping function may losslessly transform all or part of the memory address so that the underlying information may be recovered. In addition, the mapping function may randomly spread or distribute the memory address to reduce the probability of hot-spots in the cache. In a selected embodiment, a lookup table or one or more exclusive-OR gate circuits can be used to hash one or more bits in an index portion of a memory address to form a randomized cache index portion of the cache index.

In accordance with various embodiments of the present invention, a method and apparatus provide cache address hashing to protect against cache address hot spots in an integrated circuit multithreaded processor or processor system that includes a memory (such as an L1, L2 cache, L3 cache or main memory shared by multiple threads and/or by a plurality of processor elements) and one or more processing elements or cores. When memory requests issued by the processing element(s) are formatted according to a first addressing protocol, the memory addresses may be converted in the course of accessing a cache memory into a second addressing protocol using an address map to hash all or part of the index portion of the first addressing protocol into an index portion of the second addressing protocol. For example, an exclusive OR circuit may be used to combine a bit set of the index portion of the first addressing protocol with a first bit set of the first tag portion of the first addressing protocol to form a bit set of the index portion of the second addressing protocol. One or more such exclusive OR circuits may use overlapping or mutually exclusive bit sets to form all or part of the index portion of the second addressing protocol which is used to index into the cache memory. Address hashing may be enabled by software so that an address mapper contained in each processing unit maps the first addressing protocol to the second or hashed addressing protocol. Alternatively, when address hashing is disabled by software, the index portion of the first addressing protocol is used to access the memory.

The objects, advantages and other novel features of the present invention will be apparent to those skilled in the art from the following detailed description when read in conjunction with the appended claims and accompanying drawings.

DETAILED DESCRIPTION

As explained herein, when multiple thread and/or processor operations are using a shared memory system, the memory operations must be coordinated so that each thread can access the memory in an ordered and coherent way with minimal delay or latency. For purposes of providing an exemplary and not limiting description, it will be useful to describe the various aspects and embodiments of the invention herein in the context of memory operations for an on-chip cache memory system that is constructed with CMOS SRAM memory cells. However, the present invention is not limited to CMOS-based processes and may be used in connection with other categories of memory products, including without limitation, DRAM, ROM, flash, PLA and the like, whether integrated within a VLSI system, cache or non-cache, or a stand alone memory device.

Figure 1:
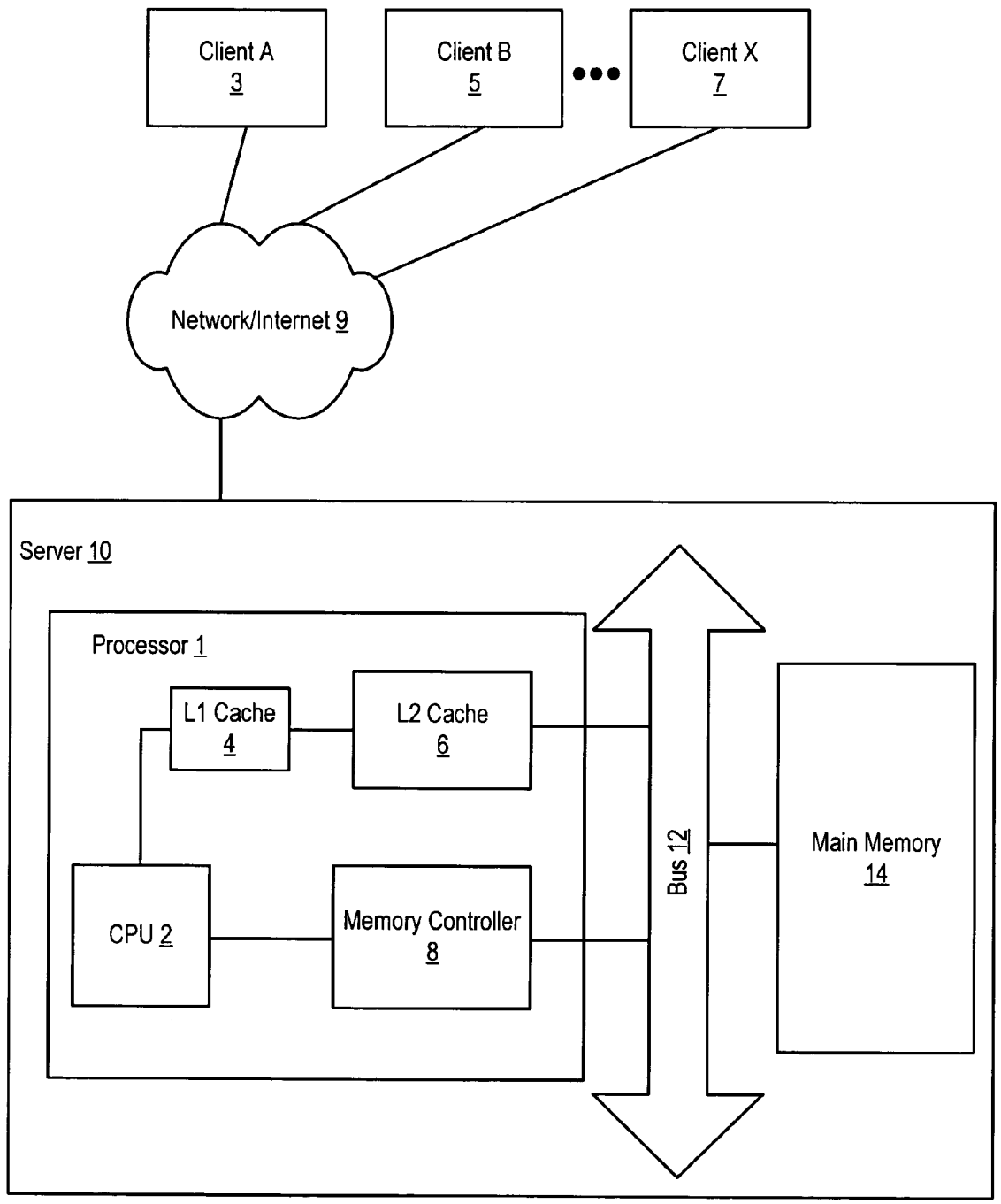
FIG. 1 illustrates a computer system in a communication network.
Figure 2A:
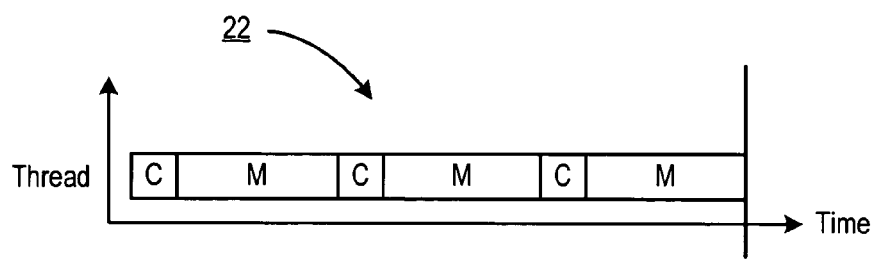
FIGS. 2a and 2b are timing diagrams respectively illustrating execution flows of a single-thread processor and a vertical multithread processor.
Figure 2B:
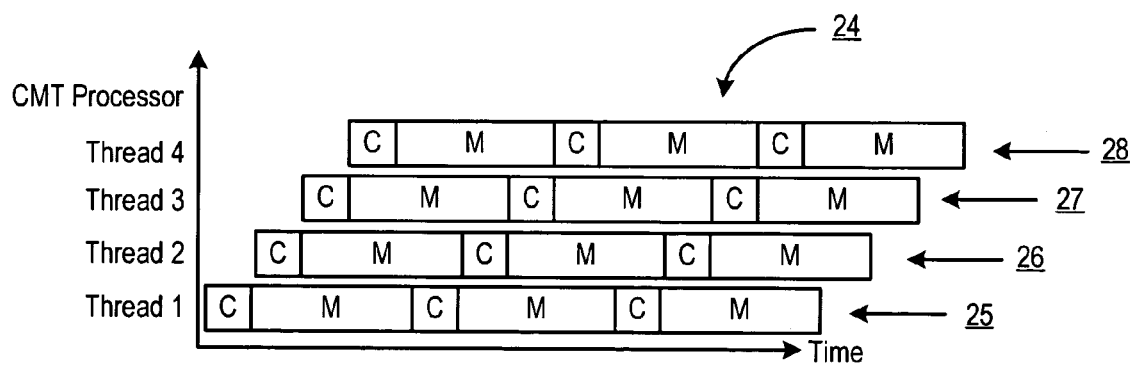
Figure 3:
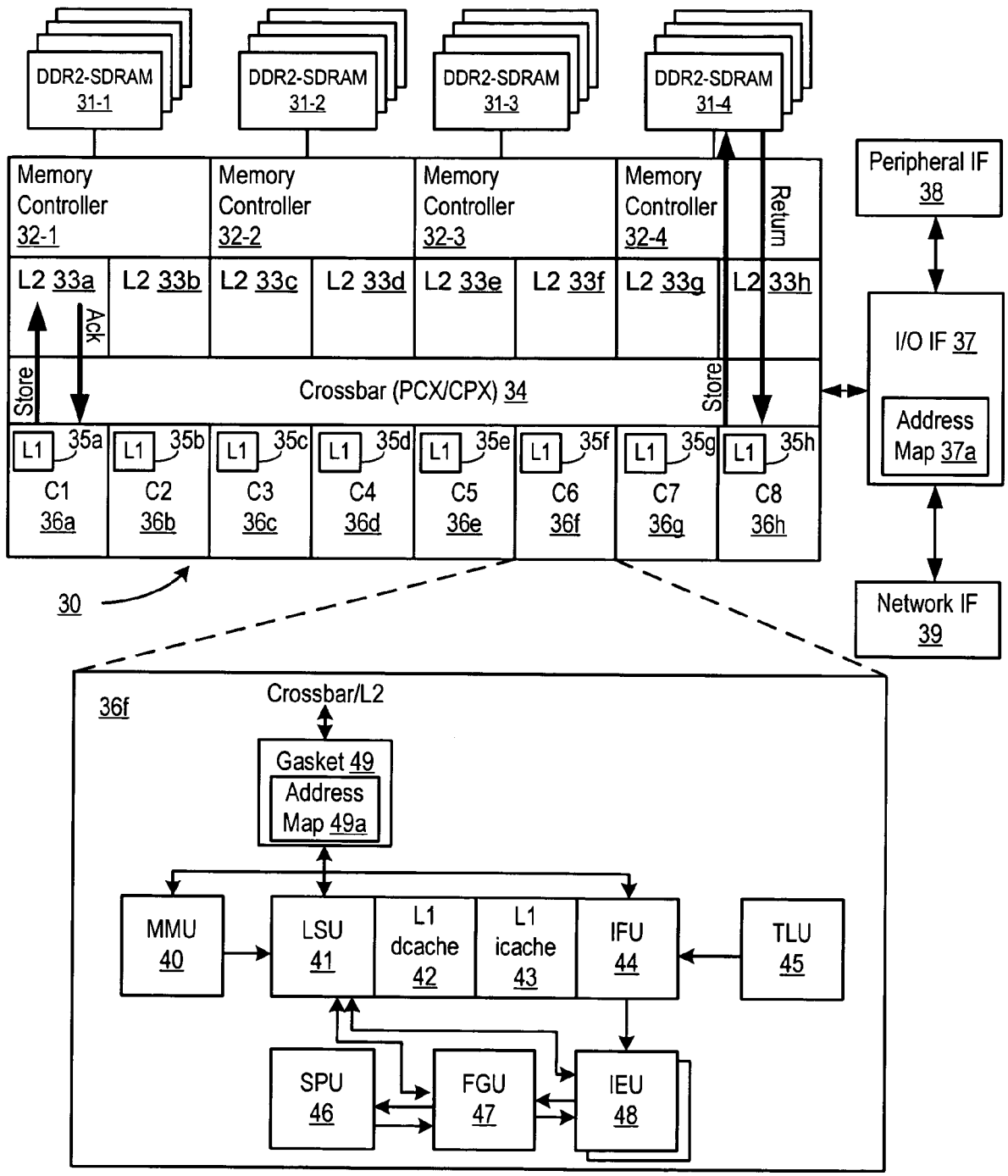
FIG. 3 illustrates a simplified schematic diagram of a processor chip having multiple processor cores for executing multiple threads, wherein each core contains a first level cache and the multiple cores share a second level cache in accordance with an exemplary embodiment of the invention.

A selected embodiment of the present invention is shown in FIG. 3, which depicts a simplified schematic diagram of a processor chip 30 having multiple processor cores for processing multiple threads. In the illustrated embodiment, processor chip 30 includes a plurality of processor cores 36a-h, which are also designated "C1" though "C8." Each of cores 36 is coupled to an L2 cache 33 via a crossbar 34. L2 cache 33 is coupled to one or more memory controller(s) 32, which are coupled in turn to one or more banks of system memory 31. Additionally, crossbar 34 couples cores 36 to input/output (I/O) interface 37, which is in turn coupled to a peripheral interface 38 and a network interface 39.

Cores 36 may be configured to execute instructions and to process data according to a particular instruction set architecture (ISA). In one embodiment, cores 36 may be configured to implement the SPARC V9 ISA, although in other embodiments, it is contemplated that any desired ISA may be employed, such as x86, PowerPC, or MIPS, for example. In a selected embodiment, a highly suitable example of a processor design for the processor core is a SPARC processor core, UltraSPARC processor core or other processor core based on the SPARC V9 architecture. Those of ordinary skill in the art also understand the present invention is not limited to any particular manufacturer's microprocessor design. The processor core may be found in many forms including, for example, the 64-bit SPARC RISC microprocessor from Sun Microsystems, or any 32-bit or 64-bit microprocessor manufactured by Motorola, Intel, AMD, or IBM. However, any other suitable single or multiple microprocessors, microcontrollers, or microcomputers may be utilized. In the illustrated embodiment, each of cores 36 may be configured to operate independently of the others, such that all cores 36 may execute in parallel. In some embodiments, each of cores 36 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multithreaded (MT) core. In an example embodiment shown in FIG. 3, each processor core includes eight threads. Thus, a single processor chip 30 with eight cores (C1 through C8) will have sixty-four threads in this configuration. However, it should be appreciated that the invention is not limited to eight processor cores, and that more or fewer cores can be included. In other embodiments, it is contemplated that core may process different numbers of threads.

Each processor core 36a-36h is in communication with crossbar 34 which manages data flow between cores 36 and the shared L2 cache 33 and may be optimized for processor traffic where it is desirable to obtain extremely low latency. The crossbar 34 may be configured to concurrently accommodate a large number of independent accesses that are processed on each clock cycle, and enables communication data requests from cores 36 to L2 cache 33, as well as data responses from L2 cache 33 to cores 36. In one embodiment, crossbar 34 may include logic (such as multiplexers or a switch fabric, for example) that allows any core 36 to access any bank of L2 cache 33, and that conversely allows data to be returned from any L2 bank to any core. Crossbar 34 may also include logic to queue data requests and/or responses, such that requests and responses may not block other activity while waiting for service. Additionally, in one embodiment crossbar 34 may be configured to arbitrate conflicts that may occur when multiple cores attempt to access a single bank of L2 cache 33 or vice versa. Thus, the multiple processor cores 36a-36h share a second level (L2) cache 33 through a crossbar bus 34 (processor to cache and cache to processor, a.k.a. PCX and CPX).

In connection with the example described herein, each processor core (e.g., 36f) shares an L2 cache memory 33 to speed memory access and to overcome the delays imposed by accessing remote memory subsystems (e.g., 31). Cache memory comprises one or more levels of dedicated high-speed memory holding recently accessed data, designed to speed up subsequent access to the same data. When data is read from main memory (e.g., 31), a copy is also saved in the L2 cache 33, and an L2 tag array stores an index to the associated main memory. The L2 cache 33 then monitors subsequent requests for data to see if the information needed has already been stored in the L2 cache. If the data had indeed been stored in the cache (i.e., a "hit"), the data is delivered immediately to the processor core 36 and the attempt to fetch the information from main memory 31 is aborted (or not started). If, on the other hand, the data had not been previously stored in the L2 cache (i.e., a "miss"), the data is fetched from main memory 31 and a copy of the data and its address is stored in the L2 cache 33 for future access.

Figure 4:
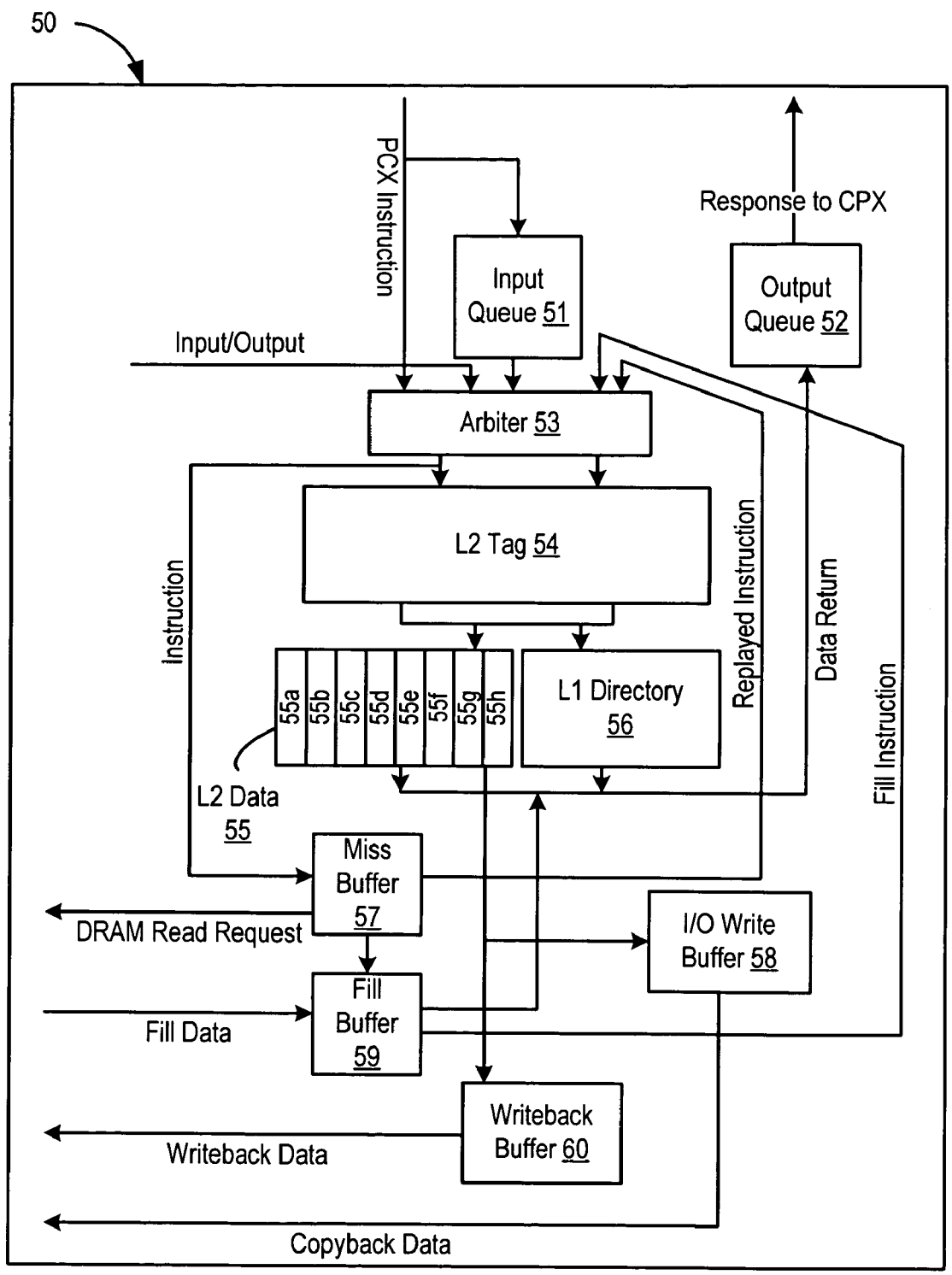
FIG. 4 depicts the organization of a second level cache memory in accordance with an illustrative embodiment of the invention.

The shared L2 cache 33 accepts requests from the processor cores 36 on the processor to cache crossbar (PCX) 34 and responds on the cache to processor crossbar (CPX) 34. As described herein, the L2 cache 33 is also responsible for maintaining coherency across all caches on the chip by keeping a copy of all L1 tags in a directory structure. FIG. 4 depicts the organization of an L2 cache memory 50 in accordance with an illustrative embodiment of the invention. The L2 cache 50 includes eight banks that are shared by the processor cores. It should be appreciated that, by sharing L2 cache banks, concurrent access may be made to the multiple banks, thereby defining a high bandwidth memory system. The invention is not limited to eight L2 cache banks or to any particular size, but the illustrated embodiment should be sufficient to provide enough bandwidth from the L2 cache to keep all of the cores busy most of the time. The L2 cache 50 includes an L2 data array 55 and tag array 54 configured to cache instructions and data for use by cores. In the illustrated embodiment, L2 cache 50 may be organized into eight separately addressable banks that may each be independently accessed, such that in the absence of conflicts, each bank may concurrently return data to any of the processor cores 36a-h. In some embodiments, each individual bank may be implemented using set-associative or direct-mapped techniques. For example, in one embodiment, L2 cache 50 may be a 4 megabyte (MB) cache, where each 512 kilobyte (KB) bank (e.g., 55a) is 16-way set associative with a 64 byte (64B) cache line size, although other cache sizes and geometries are possible and contemplated. L2 cache 50 may be implemented in some embodiments as a writeback cache in which written (dirty) data may not be written to system memory until a corresponding cache line is evicted.

In some embodiments, L2 cache 50 may implement an input queue 51 for holding requests arriving from the crossbar, and an output queue 52 for buffering results to be sent to the crossbar. Additionally, in some embodiments, L2 cache 50 may implement a fill buffer 59 configured to store fill data arriving from memory controller 32, a writeback buffer 60 configured to store dirty evicted data to be written to memory, an I/O write buffer 58 configured to store incoming data from the crossbar in the event of multi-cycle memory write operations and/or a miss buffer 57 configured to store L2 cache accesses that cannot be processed as simple cache hits (e.g., L2 cache misses, cache accesses matching older misses, accesses such as atomic operations that may require multiple cache accesses, etc.). L2 cache 50 may variously be implemented as single-ported or multi-ported (i.e., capable of processing multiple concurrent read and/or write accesses). In either case, L2 cache 50 may implement arbitration logic 53 to prioritize cache access among various cache read and write requestors. While the L2 cache 50 may include a tag array 54 for holding the memory addresses of the L2 cache data array 55, the L2 cache 50 may also advantageously include an additional tag array 54 for holding the memory addresses of each L1 cache data array in each processor core. The additional tag array 54 is referred to as the L1 directory because it maintains a copy of the L1 tags for coherency management and also ensures that the same line is not resident in both the instruction cache and data cache (across all cores). Thus, the L1 directory 56 is split into an instruction cache directory and a data cache directory. On certain data accesses, the L1 directory 56 is CAMed to determine whether the data is resident in L1 caches. The result of this CAM operation is a set of match bits which is used to create an invalidation vector to be sent back to the processor cores.

Referring again to FIG. 3, the L2 cache 33 is in communication with main memory controller 32 to provide access to the external memory 31 or main memory (not shown). Memory controller 32 may be configured to manage the transfer of data between L2 cache 33 and system memory, for example in response to L2 fill requests and data evictions. In some embodiments, multiple instances of memory controller 32 may be implemented, with each instance configured to control a respective bank of system memory. Memory controller 32 may be configured to interface to any suitable type of system memory, such as Double Data Rate or Double Data Rate 2 Synchronous Dynamic Random Access Memory (DDR/DDR2 SDRAM), or Rambus DRAM (RDRAM), for example. In some embodiments, memory controller 32 may be configured to support interfacing to multiple different types of system memory.

In the illustrated embodiment, processor chip 30 may be configured to receive data from sources other than system memory 31. I/O interface 37 may be configured to provide a central interface for such sources to exchange data with cores 36 and/or L2 cache 33 via crossbar 34. In some embodiments, I/O interface 37 may be configured to coordinate Direct Memory Access (DMA) transfers of data between network interface 39 or peripheral interface 38 and system memory 31 via memory controller 32. In addition to coordinating access between crossbar 34 and other interface logic, in one embodiment, I/O interface 37 may be configured to couple processor chip 30 to external boot and/or service devices. For example, initialization and startup of processor chip 30 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor chip 30, before the boot process proceeds to load data from a disk or network device. Additionally, in some embodiments such an external device may be configured to place processor chip 30 in a debug, diagnostic, or other type of service mode upon request.

Peripheral interface 38 may be configured to coordinate data transfer between processor chip 30 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 38 may implement one or more instances of an interface such as Peripheral Component Interface Express (PCI-Express), although it is contemplated that any suitable interface standard or combination of standards may be employed. For example, in some embodiments, peripheral interface 38 may be configured to implement a version of Universal Serial Bus (USB) protocol or IEEE 1394 (Firewire) protocol in addition to or instead of PCI-Express.

Network interface 39 may be configured to coordinate data transfer between processor chip 30 and one or more devices (e.g., other computer systems) coupled to processor chip 30 via a network. In one embodiment, network interface 39 may be configured to perform the data processing necessary to implement an Ethernet (IEEE 802.3) networking standard such as Gigabit Ethernet or 10-gigabit Ethernet, for example, although it is contemplated that any suitable networking standard may be implemented. In some embodiments, network interface 39 may be configured to implement multiple discrete network interface ports.

The multiprocessor chip 30 described herein and exemplified in FIG. 3 may be configured for multithreaded execution. More specifically, in one embodiment each of cores 36 may be configured to perform fine-grained multithreading, in which each core may select instructions to execute from among a pool of instructions corresponding to multiple threads, such that instructions from different threads may be scheduled to execute adjacently. For example, in a pipelined embodiment of core 36*f* employing fine-grained multithreading, instructions from different threads may occupy adjacent pipeline stages, such that instructions from several threads may be in various stages of execution during a given core processing cycle.

Figure 5:
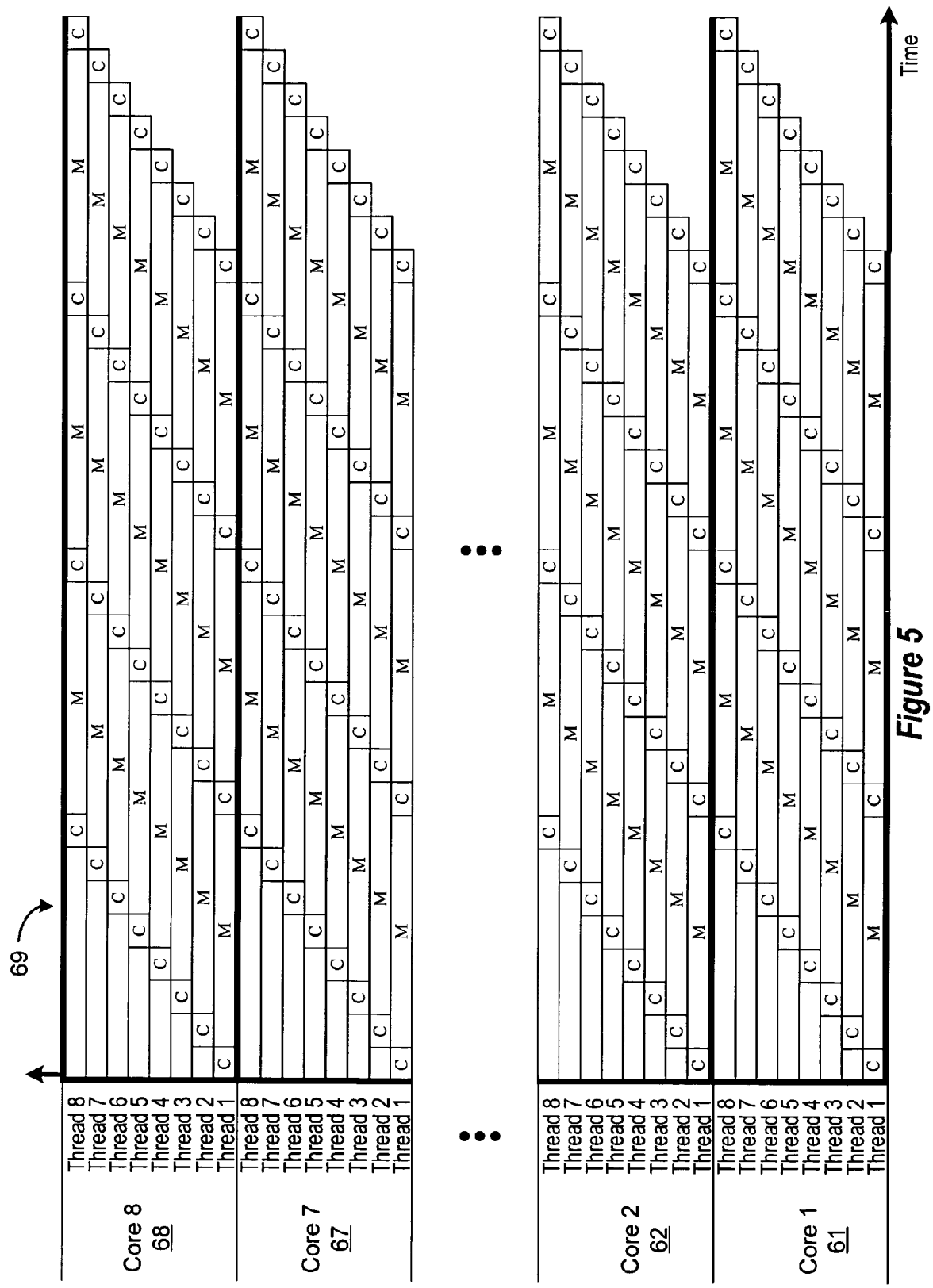
FIG. 5 is a timing diagram illustrating an execution flow of a vertical and horizontal multithread processor in accordance with an illustrative embodiment of the invention.

FIG. 5 is a timing diagram illustrating execution flow of a vertical and horizontal multithread multiprocessor embodiment of the invention using a high throughput architecture with eight processor cores 61-68, each having eight threads. In FIG. 5, the execution flow for a given vertical threaded processor 61 (e.g., Core 1) includes execution of multiple threads (e.g., Threads 1-8). For each thread in each core, the areas labeled "C" show periods of execution and the areas labeled "M" show time periods in which a memory access is underway, which would otherwise idle or stall the processor core. Thus, in the first processor core (Core 1), Thread 1 uses the processor core (during the times labeled as "C") and then is active in memory (during the times labeled as "M"). While Thread 1 in a given core is active in memory, Thread 2 in that same core accesses the processor core and so on for each of Threads 3-8. Vertical multithread processing is implemented by maintaining a separate processing state for each executing thread on a processing core. With only one of the threads being active at one time, each vertical multithreaded processor core switches execution to another thread during a memory access, such as on a cache miss. In this way, efficient instruction execution proceeds as one thread stalls and, in response to the stall, another thread switches into execution on the otherwise unused or idle pipeline. In essence, the pipeline overlaps the execution of multiple threads to maximize processor core pipeline utilization. As will be appreciated, the multiplicity of thread operations from a vertically threaded processor (e.g., core 1) will require a memory system that can process multiple references or threads simultaneously. For example, multiple memory operations must be coordinated so that each thread can access the L2 cache 33 or system memory in an ordered and coherent way with minimal contention, delay or latency.

In accordance with a selected embodiment of the present invention, the processor cores can be replicated a number of times in the same area. This is also illustrated in FIG. 3, which illustrates a collection of eight processor cores on a single integrated circuit die. Likewise, FIG. 5 illustrates the timing diagram for an execution flow of a horizontal threaded processor with multiple, vertical threaded processor cores, using a technique called chip multiprocessing. By using multiple vertically threaded processors—each of which (e.g., Core 1) is vertically threaded—a processor system is formed with both vertical and horizontal threading, augmenting executing efficiency and decreasing latency in a multiplicative fashion. The execution flow 69 illustrated in FIG. 5 for a vertical and horizontal threaded processor includes execution of threads 1-8 on a first processor core (Core 1), execution of threads 1-8 on a second processor core (Core 2), and so on with processor cores 3-8. Execution of threads 1-8 on the first processor core (Core 1) illustrates vertical threading. Similarly, execution of threads 1-8 on the second processor (Core 2) illustrates vertical threading. Where a single system or integrated circuit includes more than one processor core, the multiple processor cores executing multiple threads in parallel is a chip multithreading (CMT) processor system. The combination of vertical multithreading and horizontal multithreading increases processor parallelism and performance, and attains an execution efficiency that exceeds the efficiency of a processor with only vertical multithreading. The combination of vertical multithreading and horizontal multithreading also advantageously reduces communication latency among local (on-chip) multi-processor tasks by eliminating much signaling on high-latency communication lines between integrated circuit chips. Horizontal multithreading further advantageously exploits processor speed and power improvements that inherently result from reduced circuit sizes in the evolution of silicon processing. However, with the use of vertically and horizontally threaded processors, the coordination requirements for the resulting multiplicity of thread operations from multiple processors (e.g., cores 1-8) will require a memory system that can coordinate multiple memory operations where, for example, each thread must access the L2 cache 33 or system memory in an ordered and coherent way with minimal contention, delay or latency.

In the illustrative embodiment depicted in FIG. 3, each core (e.g., 36f) may be configured to perform fine-grained horizontal multithreading operations. The depicted core 36f includes an instruction fetch unit (IFU) 44 that is coupled to a memory management unit (MMU) 40, a trap logic unit (TLU) 45, and at least one instruction execution unit (IEU) 48. Each of execution units 48 is coupled to both a floating point/graphics unit (FGU) 47 and a load store unit (LSU) 41. Each of the LSU units is also coupled to send data back to each of execution units 48 and FGU unit 47. The FGU 47 is coupled to a stream processing unit (SPU) 46. Additionally, LSU 41, IFU 51 and MMU 40 are coupled to a gasket or interface unit 49 for interface to the crossbar 34.

As illustrated, each threaded core (e.g., C6 36f) includes a first level cache (L1) cache (e.g., 35f) which includes a data cache (dcache) segment 42 and an instruction cache (icache) segment 43. In operation, the instruction fetch unit (IFU) 44 retrieves instructions for each thread and stores them in an instruction cache 43 and instruction buffers (not shown). IFU 44 then selects two instructions to execute among eight different threads, and provides the instructions to the decode unit which decodes one instruction each from two thread groups per cycle and supplies the pre-decoded instruction to the execution units 48. Each integer execution unit includes an arithmetic logic unit (ALU), shifter, integer register files for processing and storing thread status information. Execution unit results are supplied via selection circuits to the shared FGU 467 and LSU 41. The shared LSU 41 handles memory references between the processor core, the L1 data cache and the L2 cache. A single data cache 42 may also be provided in the LSU 58. For additional details concerning the design and operation of the processor core and its constituent resources, see co-pending U.S. patent application Ser. No. 10/880,488, entitled "Apparatus and Method for Fine-Grained Multithreading In A Multi-Pipelined Processor Core", filed Jun. 30, 2004, published as US 2006/0004995 A1, and assigned to Sun Microsystems, which is hereby incorporated by reference in its entirety.

In a highly threaded multiprocessor chip with an L2 cache that is shared among all threads and processors, contention for particular indices in the L2 cache can be a pronounced problem. Given a fixed-size L2 cache, this problem can be addressed by increasing the associativity of the cache so that the associativity of a shared structure is equal to or greater than the number of threads accessing that structure. In the example described herein of a multithreaded, multiprocessor chip having sixty-four threads, the L2 cache would be a 64-way associative cache. However, there are significant challenges to implementing an associative memory at this level, since an increase in the associativity increases the number of compares which must be done in parallel and increases the difficulty of selecting a good replacement algorithm since least-recently-used (LRU) or pseudo LRU algorithms are difficult to implement as the associativity grows beyond 16 ways.

The contention problem for such a highly threaded multiprocessor chip may also be addressed by randomizing the L2 cache index used to access the cache to reduce the probability of hot-spots. For example, a memory address may be randomized to map the memory address into a cache address (such as a physical address) by hashing certain bits of the L2 cache index. The mapping function may losslessly transform all or part of the memory address so that the underlying information may be recovered. In addition, the mapping function may randomly spread or distribute the memory address to reduce the probability of hot-spots in the cache. In a selected embodiment, one or more exclusive-OR gate circuits can be used to hash one or more bits in an index portion of a memory address to form a randomized cache index portion of the cache index. While those skilled in the art can use trace-driven cache simulations to select various hashing algorithms, an exemplary embodiment of the present invention uses the following L2 cache hash:

addr_to_L2[39:0]={pa[39:18], pa[32:28]^pa[17:13], pa[19:18]^pa[12:11], pa[10:0]} where pa[a:b] denotes bits a through b of the physical address, inclusively, '^' denotes XOR, and {x,y} denotes the concatenation of x and y.

For the address mapping function to be used in transforming L2 cache addresses, any resource seeking to access the L2 cache 33 should include address mapping circuitry so that the L2 cache addresses are transformed prior to being sent to the L2 cache 33. This can be done in a variety of ways. In the embodiment illustrated in FIG. 3, each processor core (e.g., 36f) includes an address map circuit (e.g., 49a) interposed between the processor core and the crossbar. Though illustrated as being included as part of the gasket unit 49, this address map circuit 49 could also be located at any point in the data path between the processor core resources and the L2 cache 33. As will be appreciated, resources outside of the processor cores may also seek access to the L2 cache. One example would be a DMA transfer through the I/O interface 37. Such accesses should also be made through an address map circuit (e.g., address map 37a), which again can be included in or separate from the I/O interface 37.

Figure 6:
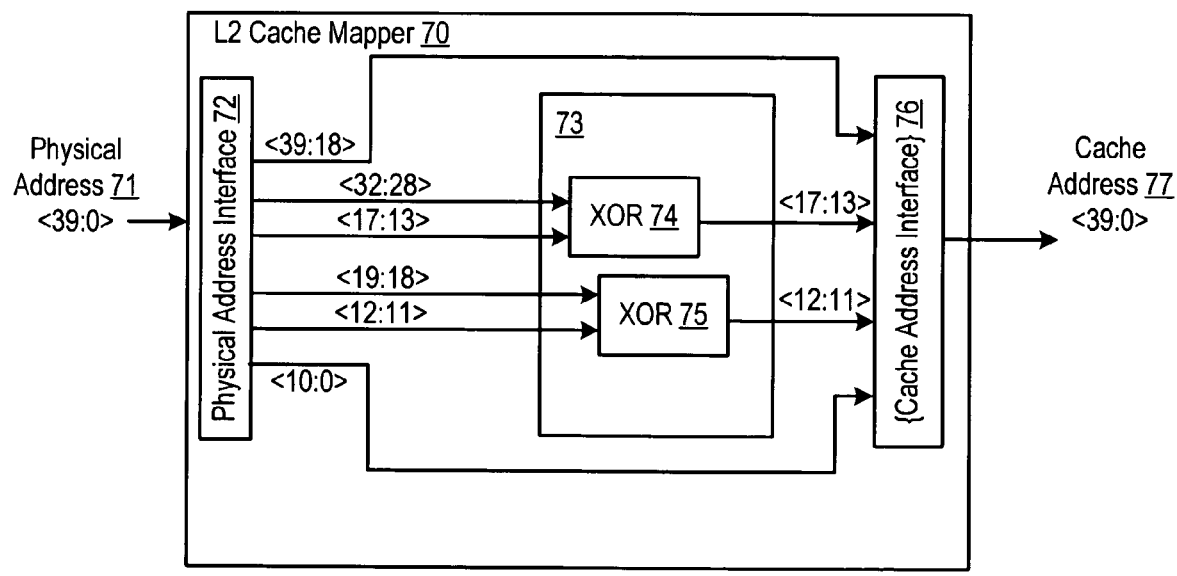
FIG. 6 is a simplified schematic block diagram of an L2 cache address mapper in accordance with an illustrative embodiment of the invention.

FIG. 6 illustrates a simplified schematic block diagram of an L2 cache address mapper 70 in accordance with the foregoing illustrative embodiment of the invention. As illustrated, the address mapper 70 receives a physical address 71 (shown as being a 40-bit address, though addresses having other bit lengths or formats may be used) and buffers the physical address in an input interface or buffer 72. While some of the address bits (e.g., bits 0-10 and 18-39) may advantageously be passed directly to an output interface or buffer 76, other address bits may be transformed by the transformation unit 73. In a selected embodiment, the transformation unit 73 includes exclusive-OR circuitry for hashing predetermined bits of the physical address. While a variety of hash algorithms can be applied to various address bits in accordance with the present invention, FIG. 6 shows that a first logic circuit (e.g., XOR gate 74) hashes address bits 13-17 with address bits 28-32, and that a second logic circuit (e.g., XOR gate 75) hashes address bits 11-12 with address bits 18-19. The transformed bits are passed to the output interface or buffer 76, where they are concatenated to generate a hashed cache address 77.

Figure 7:
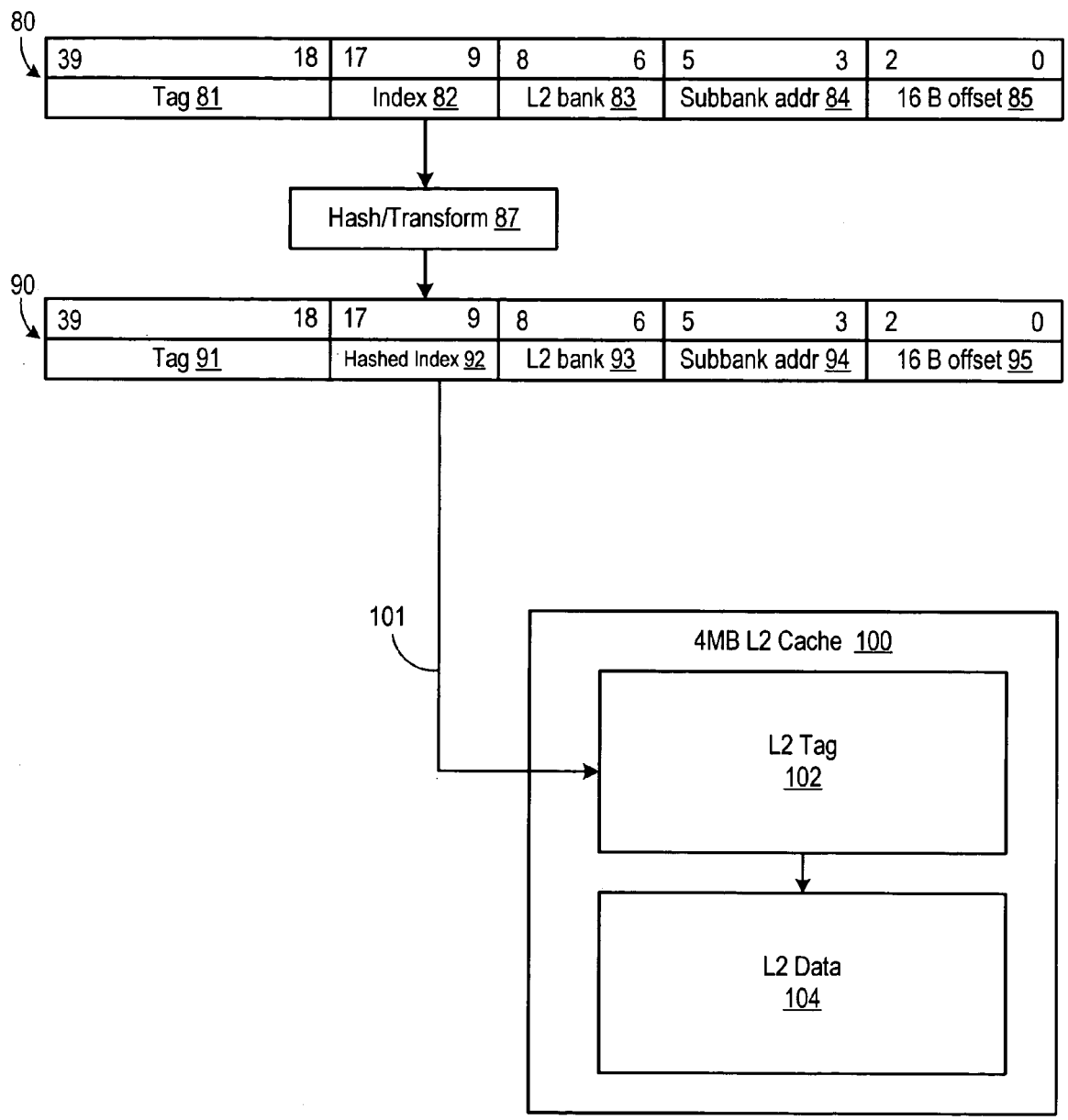
FIG. 7 is a schematic block diagram showing a suitable cache index hashing operations for use in various processor implementations including a cache, such as an L1 cache, and L2 cache, or other memories.

FIG. 7 depicts a schematic block diagram of cache index hashing operation for use in various processor implementations including a cache memory 100 (such as an L1 cache, and L2 cache or other memories) that includes a data array 104 and tag array 102 which is accessed with an index input 101. As illustrated, the cache 100 is addressed with an index portion of a physical address, though virtual addressing schemes may also be used. In particular, a 40-bit physical address storage 80 includes a cache address tag bit field 81 with address bits [39:18], an index bits field 82 with index bits [17:9], a cache bank bits field 83 with bank bits [8:6], a sub-bank address bits field 84 with sub-bank address bits [5:3] and a byte offset bit field 85 with address bits [2:0].

Conflicting cache accesses to memory 100 can be reduced by implementing the cache memory 100 as a multiple bank cache, where the banks can be equally sized. Alternatively, the cache can be partitioned so that only subsets are available to different processors, and the subsets are not shared between processors or groups of processors. The use of a multi-bank cache avoids interference, "cross-talk" or "pollution" between threads. One technique for using multi-block caches uses logic for storing and communicating thread identification (TID) bits. For example, the cache 100 utilizes cache indexing logic to insert TID bits at the most significant bits of the cache index field 82. Sharing of an L2 cache among threads is easily implemented since the L2 cache is physically indexed.

Conflicting cache accesses to memory 100 can also be reduced by increasing the associativity of the cache memory 100. In a selected embodiment, the cache memory (e.g., L2 cache memory 100) is implemented as a multiple bank cache having up to 16-way associativity. In a selected embodiment, L2 cache 100 is a writeback cache that is 4 MB in size and is composed of eight banks, each of which has a fixed cache line width (e.g., 64B), is 16-way set associative, is 512 KB in size and operates independently of all others.

Conflicting cache accesses to memory 100 can also be reduced by randomizing the index 101 used to access the cache memory 100. For example, a hash circuit 87 transforms the index bits field 82 into a hashed index bits field 92. In a selected embodiment, one or more bits from the index bits field 82 is transformed into a hashed index 92 for use in accessing the cache tag 102 to determine if the cache 100 contains the requested data. In this example, the transformed address used to address the cache 100 is a 40-bit physical address storage 90 that includes a cache address tag bit field 91 with address bits [39:18], a hashed index bits field 92 with index bits [17:9], a cache bank bits field 93 with bank bits [8:6], a sub-bank address bits field 94 with sub-bank address bits [5:3] and a byte offset bit field 95 with address bits [2:0].

Various hash algorithms 87 may be used to transform the cache address, and persons of ordinary skill in the art can use trace-driven cache simulation techniques to optimize a hash algorithm, based upon the applicable architecture, available resources and software requirements. However, exclusive-OR gate logic devices provide an efficient hashing mechanism because of the simplicity and speed of operation of such devices. In addition, using such logic devices to implement a lossless hashing algorithm allows the original index information to be reconstructed if necessary. An example would be to use all of the index bits of interest from the index bits field 82 in any exclusive-OR hash.

In a selected implementation for hashing the index to a 16-way L2 cache that handles 64 threads, excessive cache conflicts from L2 hot-sets can be reduced by hashing bits 17:9 of the physical address that are used to index into the L2 cache. In one solution, the L2 index bits are hashed with higher order bits of the physical address using Algorithm 1:

$$PA[17:9]=\{(PA[32:28]\hat{\ }PA[17:13]),(PA[21:18]\hat{\ }PA[12:9])\} \quad \text{Algorithm 1}$$

Such a hashing scheme represents a useful solution for many L2 cache configurations that can be implemented quickly and cheaply (in terms of circuit complexity and space). But some architectural configurations for an L2 cache may require other hashing solutions. Referring, for example, to the example depicted in FIG. 4, which show an L2 cache which maintains cache coherency for the L1 cache through the L1 directory 56 which holds information regarding the contents of the Level 1 caches (dcache 42 and icache 43) for each processor core (e.g., C6 36*f*). If, in this example, bits 10:4 of the physical address are used as index bits for the L1 dcache 42, and bits 8:6 of the physical address are used to select a bank of the multi-bank L2 cache data array 104, then bits 8:6 are used for selecting the L2 bank and are also part of the bits used for determining L1 dcache index. This would require that a given L1 dcache set can contain data only from a single predetermined L2 bank. Thus, each bank of an eight bank L2 cache would only need to contain a directory describing the contents of one of the eight L1 tags or sets from each processor core. However, because the hashing scheme of Algorithm 1 involves modifying bits 17:9 of the physical address based on upper address bits, the hashing of bits 10:9 (which are part of the L1 dcache index bits) can result in two different L1 dcache sets mapping to the same directory entry in L2. This can result in a L1 directory overflow when there are multiple L1 sets trying to map to an L1 directory if the L1 directory does not have sufficient space to hold them. To maintain coherency, a load miss in the L1 dcache which hits in L2 could potentially need to invalidate a valid entry which resides in a different set in the L1 dcache (because the load miss and the entry to be invalidated map to the same entry in L2 directory).

In order to avoid the complication of having to invalidate entries on load misses, and the associated performance loss, an alternative hashing algorithm may be used to accommodate architectural requirements of the example. In this algorithm, only bits 17:11 of the L2 index would be hashed, as set forth below at Algorithm 2:

$$PA[17:11]=\{(PA[32:38]\hat{\ }PA[17:13]),(PA[19:18]\hat{\ }PA[12:11])\} \quad \text{Algorithm 2}$$

This hashing function can be performed the gasket unit 49 if each processor core with little timing impact on the L2 cache operations. Other resources that access the L2 cache (such as the I/O interface unit 37) will have to perform a similar hash.

As will be appreciated, the hash function is performed only for memory addresses (physical address bit 39 is a 0). If bit 39 is 1, the address goes to one of the I/O or diagnostic spaces and cannot be hashed. Alternatively and in order to provide flexibility, the hashing function can be enabled or disabled by software at reset time. For example, a configuration bit may be defined which enables hashing. Disabling the hash uses the physical address bits to index the L2 directly.

In accordance with a selected embodiment, the methods and systems for reducing cache conflicts by hashing a cache index as shown and described herein may be implemented with control logic that provides the address transformation and hashing functions described herein. The invention, for example, can be implemented in connection with any addressing scheme that is used to access a cache array, such as included with a microprocessor circuit. For clarity, only those aspects of the software germane to the invention are described, and product details well known in the art are omitted. For the same reason, the computer hardware is not described in further detail. It should thus be understood that the invention is not limited to any specific logic implementation, computer language, program, or computer.

Figure 8:
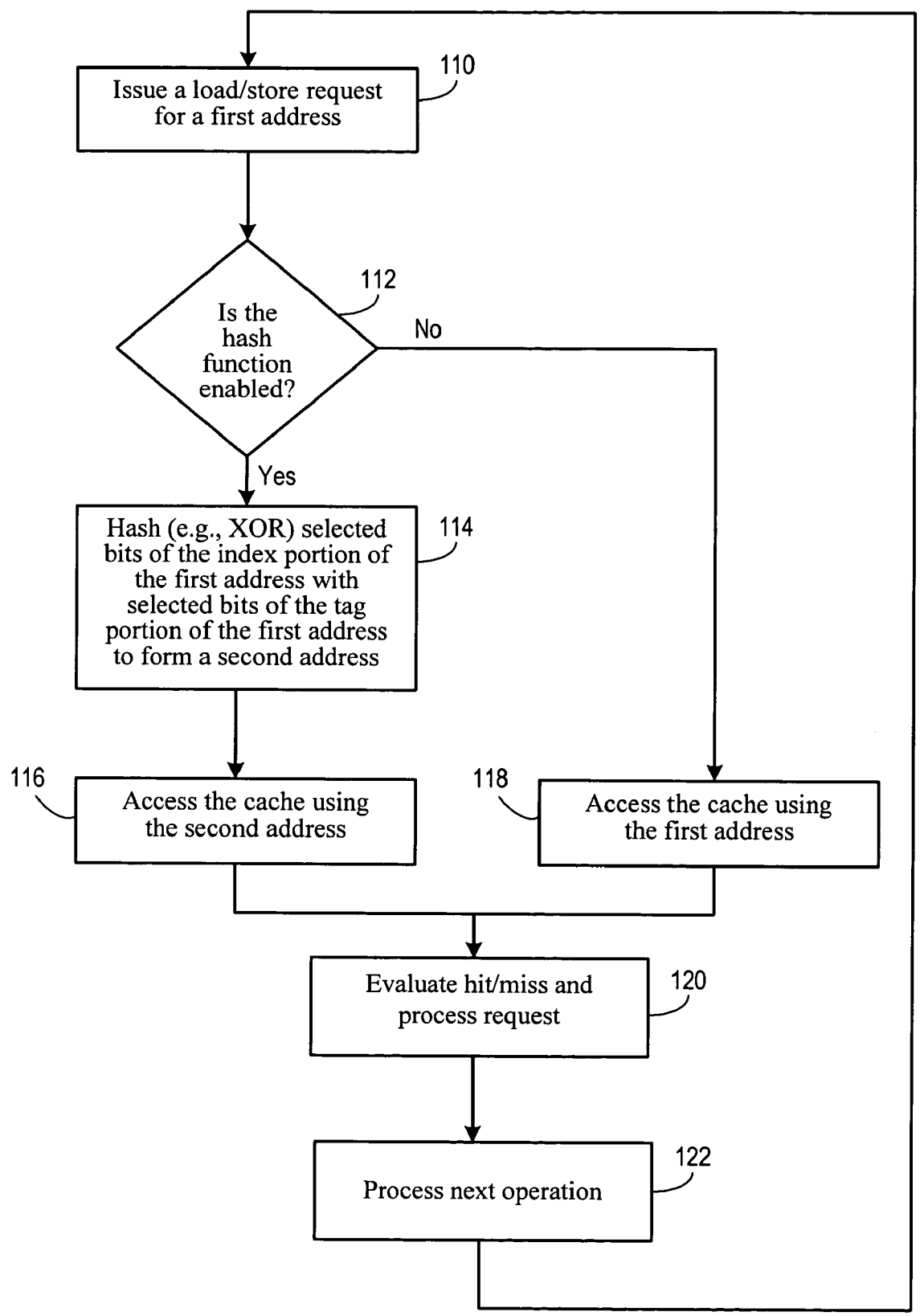
FIG. 8 depicts an exemplary flow methodology for implementing cache index hashing to avoid hot spots.

Turning now to FIG. 8, an exemplary method for implementing various embodiments of a cache index hashing system is illustrated. As will be appreciated, the methodology illustrated in FIG. 8 follows the processing of a load or store instruction through for a given thread as it issues from a processor core and attempts to access a cache memory. In a multithreaded processor implementation, the disclosed methodology may be implemented in a pipelined fashion for each thread to generate a sequence of cache access operations. Moreover, when implemented on a multithreaded multiprocessor, the disclosed methodology may be implemented in a pipelined fashion for each thread on each processor to generate a sequence of cache access operations on a shared cache memory.

The method begins at step 110, where a load or store request is issued for a first address, which may be formatted, for example, as a physical address (used by hardware to access memory), virtual address (which is generated by software) or real address (used by the hypervisor with multiple operating systems). Thus, the processor core is attempting to retrieve or store information (such as an instruction or data) using a physical addressing scheme where the address may include a tag portion and an index portion specifying a memory location.

If the address hashing function is enabled (decision 112), the physical address scheme is mapped to a hashed address scheme at step 114. As will be appreciated, the determination of whether the hashing function is enabled can be made at any point in the processing of memory addresses, and may be set during system boot-up, and can be enabled or disabled by software at reset time. Thus, the detection of whether the hash function is enabled could also occur prior to the sequence of steps shown in FIG. 8.

The hashing step 114 can be implemented in a variety of ways. For example, the index portion of the first address could be combined or hashed to form the second address, such as by combining the index portion and the tag portion of the first address using an exclusive OR gate function to produce the second address. In another example, an exclusive OR circuit is used for hashing a bit set (e.g., bits 13 through 17) of the index portion of the first address with a first bit set (e.g., bits 28 through 32) of the first tag portion of the first address to form a bit set (e.g., bits 13 through 17) of the index portion of the second address. If another exclusive OR circuit is used to hash the remainder (e.g., bits 11 through 12) of the index portion of the first address with a corresponding bit set (e.g., bits 18 through 19) of the first tag portion of the first address, the entire index portion of the first address is efficiently hashed to form the index portion of the second address. In a selected embodiment, each bit set from the first address that is hashed is mutually exclusive from one another, though this is not necessarily required.

Once the first address is transformed or hashed into the second address (step 114), the second address is used to access the cache (step 116), assuming that the hash function was enabled (a "yes" outcome to decision 112). As a result of this hashing function, the cache address is randomized to reduce the probability of hot-spots. On the other hand, if the hash function was not enabled (a "no" outcome to decision 112), the first address is used to access the cache (step 118).

Whichever addressing scheme is used to access the cache (steps 116, 118), the cache determines if the request hit or miss in the cache and processes the request accordingly (step 120), for example by either servicing the request from the cache or going to main memory to service the request. After the request is processed, the next operation is processed (step 122), which may involve another load or store instruction. As will be appreciated, the methodology of the present invention may be thought of as performing the identified sequence of steps in the order depicted in FIG. 8, though the steps may also be performed in parallel, in a different order or as independent operations that separately generate cache addresses as described herein.

As set forth above, a method and apparatus for preventing cache memory contention problems are described. For clarity, only those aspects of the chip multithreading (CMT) processor system germane to the invention are described, and product details well known in the art are omitted. For the same reason, the computer hardware is not described in further detail. It should thus be understood that the invention is not limited to any specific logic implementation, computer language, program, or computer. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of microprocessor design to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the present invention has been particularly described with reference to FIGS. 1-8 and with emphasis on certain memory structures, it should be understood that the figures are for illustration purposes only and should not be taken as limitations upon the present invention. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A single chip multithreaded processor comprising:
   a plurality of processor cores, where each core supports multiple threads by generating requests to load or store information using a physical addressing scheme wherein each physical address comprises a first tag portion and an index portion;
   a second level cache memory coupled to said processor core for storing or loading data and/or instructions that are accessed using a hashed addressing scheme wherein each hashed address comprises a second tag portion and a hashed index portion and wherein each hashed address addresses a location in the second level cache memory for storing or loading data and/or instructions; and an address mapping unit for converting a physical address consistent with the physical addressing scheme into a hashed address consistent with the hashed addressing scheme by hashing the index portion of the physical address to form the index portion of the hashed address.

2. The single chip multithreaded processor of claim 1, wherein the plurality of processor cores comprises at least eight processor cores, where each core supports at least eight threads.

3. The single chip multithreaded processor of claim 1, wherein second level cache memory comprises a multi-way associative cache.

4. The single chip multithreaded processor of claim 1, wherein second level cache memory comprises a 16 way set associative cache.

5. The single chip multithreaded processor of claim 1, wherein the address mapping unit comprises an exclusive OR circuit for hashing the index portion of the physical address to form the index portion of the hashed address.

6. The single chip multithreaded processor of claim 1, wherein the address mapping unit comprises a first exclusive OR circuit for hashing a bit set of the index portion of the physical address to form a bit set of the index portion of the hashed address.

7. The single chip multithreaded processor of claim 1, wherein the address mapping unit comprises
a first hash circuit for XORing a first bit set of the index portion of the physical address with a first bit set of the first tag portion of the physical address to form a first bit set of the hashed index portion, and
a second hash circuit for XORing a second bit set of the index portion of the physical address with a second bit set of the first tag portion of the address to form a second bit set of the hashed index portion.

8. The single chip multithreaded processor of claim 7, where the first bit of the index portion of the physical address and the second bit set of the index portion of the physical address are mutually exclusive bit sets.

9. The single chip multithreaded processor of claim 7, where the first bit set of the first tag portion of the physical address and the second bit set of the first tag portion of the physical address are mutually exclusive bit sets.

10. The single chip multithreaded processor of claim 7, wherein the first bit set of the index portion of the physical address and the second bit set of the index portion of the physical address together form all of the index portion of the physical address.

11. The single chip multithreaded processor of claim 1, wherein the index portion of the hashed address is used to access the second level cache to reduce the probability of hot-spots.

12. The single chip multithreaded processor of claim 1, wherein the address mapping unit can be disabled by software so that the index portion of the physical address is used to access the second level cache.

13. A processor system comprising:
at least one processing element for generating memory requests using a first addressing protocol wherein a physical address of the first addressing protocol comprises a first tag portion and an index portion; and
a memory coupled to the processing element for accessing data or instructions in the memory using a hashed addressing protocol wherein a hashed address comprises a second tag portion and a hashed index portion and wherein the hashed address addresses a location in the memory that contains data or instructions, and
a means for mapping the physical address of the first addressing protocol to a corresponding hashed address of the hashed addressing protocol by hashing the index portion of the physical address to form the index portion of the corresponding hashed address.

14. The processor system of claim 13, wherein said at least one processing element comprises a plurality of processor cores and said memory comprises a multiway associative cache that is shared by the plurality of processor cores.

15. The processor system of claim 13, wherein the means for mapping comprises
a first hash circuit for XORing a first bit set of the index portion of the physical address with a first bit set of the first tag portion of the corresponding hashed address to form a first bit set of the hashed index portion, and
a second hash circuit for XORing a second bit set of the index portion of the physical address with a second bit set of the first tag portion of the corresponding hashed address to form a second bit set of the hashed index portion.

16. The processor system of claim 13, wherein the means for mapping comprises an address mapping unit located on each processing element.

17. The processor system of claim 13, where the processor system is constructed on a single integrated circuit.

18. In a multithreaded processor comprising a shared cache memory and at least one processor element, a method for cache index hashing comprising:
issuing a memory request that designates a physical address for access, wherein the physical address is consistent with a first addressing scheme and addresses a first location in the shared cache memory;
converting the physical address into a hashed address that is consistent with a second addressing scheme by using an exclusive OR circuit to hash an index portion of the physical address to form an index portion of the hashed address, wherein the hashed address addresses a second location in the shared cache memory; and
accessing the shared cache memory using the hashed address.

19. The method of claim 18, wherein the converting of the physical address into the hashed address uses a first exclusive OR circuit for hashing a bit set of the index portion of the physical address to form a bit set of the index portion of the hashed address, and wherein the accessing comprises executing the memory request with respect to the hashed address instead of the physical address.

20. The method of claim 18, wherein the memory comprises a first level cache memory shared by multiple threads on a processor element or a second level cache memory shared by a plurality of processor elements.

* * * * *